United States Patent [19]

Del Vigna, Jr.

[11] Patent Number: 5,621,885
[45] Date of Patent: Apr. 15, 1997

[54] SYSTEM AND METHOD FOR PROVIDING A FAULT TOLERANT COMPUTER PROGRAM RUNTIME SUPPORT ENVIRONMENT

[75] Inventor: Paul Del Vigna, Jr., San Jose, Calif.

[73] Assignee: Tandem Computers, Incorporated, Cupertino, Calif.

[21] Appl. No.: 475,195

[22] Filed: Jun. 7, 1995

[51] Int. Cl.$^6$ .................................................. G06F 11/34
[52] U.S. Cl. .................... 395/182.11; 364/268.3; 364/285.3; 364/DIG. 1
[58] Field of Search ...................... 395/180, 181, 395/182.08, 182.09, 182.1, 182.11, 182.13; 371/7, 8.1, 68.1; 364/268.3, 285.3

[56] References Cited

U.S. PATENT DOCUMENTS

| | | |
|---|---|---|
| 4,351,023 | 9/1982 | Richer . |
| 5,155,678 | 10/1992 | Fukumoto et al. ........... 364/200 |
| 5,271,013 | 12/1993 | Gleeson ..................... 395/184.01 |
| 5,363,503 | 11/1994 | Gleeson ..................... 395/184.07 |
| 5,455,932 | 10/1995 | Major et al. ................ 395/184.01 |

OTHER PUBLICATIONS

Article by Borg et al., entitled "A Message System Supporting Fault Tolerance" published by *Auragen Systems Corporation*, 1983, pp. 90–99.

Article by Birman et al., entitled "Implementing Fault-Tolerant Distributed Objects" published by *IEEE Transactions on Software Engineering*, Jun. 1985, vol. SE-11 No. 6 pp. 502–508.

*Primary Examiner*—Hoa T. Nguyen
*Assistant Examiner*—Albert Décady
*Attorney, Agent, or Firm*—Graham & James LLP

[57] ABSTRACT

A system and method for automatically checkpointing a primary computer process to a backup computer process is disclosed. The system and method automatically convert a non-fault tolerant computer program into a fault tolerant computer program. The system includes multiple CPUs, a communications link between the CPUs and a user interface device, such as a terminal, workstation, or PC. A special layer of code forms an interface between the operating system for each CPU and the application programs running on the CPUs. For each process, running on one of the CPUs, the interface automatically creates a duplicate backup process on another CPU. The interface handles synchronizing communications between the original or primary process and the backup process, and suppresses or otherwise prevents or inhibits output from the backup process.

14 Claims, 3 Drawing Sheets

Microfiche Appendix Included
(2 Microfiche, 70 Pages)

SYSTEM AND METHOD FOR PROVIDING A FAULT TOLERANT COMPUTER PROGRAM RUNTIME SUPPORT ENVIRONMENT

This application includes appendices entitled: Appendix A—microfiche copy of "Simulation Program" having 1 fiche with a total of 57 frames and Appendix B—microfiche copy of "Prototype Program" having 1 fiche with a total of 13 frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. FIELD OF THE INVENTION

The present invention relates to a system and method for automatically converting non-fault tolerant software programs into fault tolerant software programs. The method can generally be implemented on any computer system that supports primary and backup software processes. Since the non-fault tolerant to fault tolerant conversion process can be implemented automatically, the programmer may write non-fault tolerant programs and the user can use the resulting programs in a fault tolerant manner without either being aware of or understanding the techniques and mechanisms used to achieve fault tolerance.

2. DESCRIPTION OF RELATED ART

A fault tolerant program is one whose normal functioning is not disrupted by the failure of a single CPU. One known technique for achieving fault tolerance employs a redundant process pair. The redundant fault tolerant process pair may consist of a primary application program process running on one CPU and a backup application process, in standby mode, configured to run on another CPU. The primary process actually does the work that the program is supposed to be doing; the backup program is dormant and does not actually run while the primary process is functioning properly. The backup program simply waits to be notified that the primary process has failed. While the backup process is dormant, checkpointing techniques periodically synchronize the backup process with the primary process. Prior known checkpointing techniques send messages, containing information about changes in the state of the primary process, from the primary process to the dormant backup process. Immediately after each checkpoint, the primary and backup processes are in the same state. Therefore, if the primary process fails, the backup process is started and simply begins executing at the instruction immediately following the most recent checkpoint.

FIG. 1 is a flow chart diagram of an exemplary software program. The specific commands shown in FIG. 1 are not of any particular significance, except to the extent the commands illustrate the methodology for implementing fault tolerance using checkpoints. The left hand side of FIG. 1 illustrates the flow of process or method steps for a primary process. The right hand side of FIG. 1 illustrates, abstractly, a dormant backup process 11 including the same application program code as the primary process, but resident on a different CPU than the primary process. At step 10 the primary process is loaded onto a first processor, a backup process is loaded onto a separate second processor and the primary process transfers initial checkpointing information to the backup process so that both processes are synchronized. Step 12 represents, generically, a series of process steps that may be carried out by the user program. Of course, these steps would be different for different application programs. They are not directly germane to achieving fault tolerance and, accordingly, these steps are indicated abstractly at reference numeral 14. At step 16 the program executes an input instruction, Read (file 1, K). Subsequently, the primary process executes a checkpoint instruction 18. As previously mentioned, a dormant backup process 11 exists on a separate CPU. The checkpointing command 18 transmits process state information from the primary process on one CPU to the backup process on the other CPU to again synchronize the states of the primary and backup processes. Upon receipt of the state information, the backup process 11 is altered to conform to the state of the primary process. Other then incorporating the new state information, the backup process 11 does not execute any instructions while the primary process continues to function properly. After the checkpointing instruction 18, the primary process executes subsequent instructions 20, 22 and eventually encounters a third checkpoint command 24. The checkpointing process is repeated so that the primary and backup processes are again synchronized. The arrows at reference numerals 26, 28 and 30 indicate the transmission of checkpointing information to the backup process 11. If the primary process fails at any point, for example at step 22, the backup process re-executes all commands beginning immediately after the most recent checkpoint, in this example checkpoint 18.

Typically, supervisory programming (or the primary process itself) is responsible for creating the backup process and checkpointing the initial state of the primary process to the backup process. Subsequently, the primary process must execute appropriate commands to request system messages about the state of the backup process and its associated CPU. If any of these system messages indicate that the backup process or associated CPU has failed, then the primary process must restart and reinitialize a backup process and checkpoint the entire current state of the primary process. Similarly, when the backup process takes over after failure of the primary, it (as the new primary) must create a new backup process and checkpoint the entire program state.

With traditional fault tolerant programming techniques, the programmer must know where to place checkpoints in the software program and must also know what things to checkpoint. Two basic kinds of information that must be checkpointed are the contents of memory and the state of open files. Memory checkpoints update the memory accessed by the backup process to reflect changes in the state of memory of the primary process since the last checkpoint. File checkpoints do the same for files. That is, file checkpoints put the primary and backup processes at the same logical position in the open file. File checkpoints also synchronize sequence numbers (known as "syncids") that are uniquely associated with each file access. As will be described in greater detail below, syncids are used to detect when a new primary process, which has taken over from a failed original primary process, duplicates a message that was previously issued by the original primary process.

As will be apparent from the forgoing discussion, the basic idea is that each checkpoint contains all modifications to memory and files that have occurred since the last checkpoint. Therefore, the programmer of software designed to run on a traditional system faces numerous difficulties in selecting what information must be checkpointed between the primary and backup processes and with tracking the modifications to the state of the primary process between checkpoints. For complex systems, this can be an extremely difficult and error prone procedure. Adding to this difficulty is the fact that, for a variety of reasons, there may be modifications to the state of the memory associated with the primary CPU that the code issuing the checkpoint does not know about. These changes are known as "hidden state." Hidden states generally occur when a program calls on the facilities of some preexisting software module that does not make information about changes in state available to the calling procedure. Currently popular software design methodologies favor this type of information hiding because it generally simplifies the design and coding of a software program. Unfortunately, however, hidden states do not mix well with fault tolerant programming. When the execution of such a module alters state information in a way that is not apparent at the interface it presents to the user program, the user program cannot know the state has been modified and, therefore, such modifications cannot be checkpointed between the primary and backup processes.

Traditional fault tolerant programming also presents the programmer with the difficulty of how to detect duplicate requests. When a backup process takes over, it resumes execution at the instruction immediately following the most recent checkpoint from the primary process. The backup process cannot know how far past the last checkpoint the primary process was when it failed. For each operation that the primary process completed after the last checkpoint, but before failure, the backup process must either be able to repeat the operation harmlessly, or it must be able to determine that the primary completed that operation. The backup process of the fault tolerant program must, therefore, ensure that it makes no duplicate requests that cannot be detected and must otherwise detect duplicate requests.

One technique for detecting duplicate requests uses syncids. For example, when the primary process fails after a write operation but before a checkpoint, the backup process will take over immediately following the previous checkpoint. Therefore, the write operation will be repeated. However, because of the checkpointing, the syncid of the write request will be the same when the backup executes the write operation as when the primary process first executed it. The disk process will detect that this is a duplicate write request because the write operation will repeat a previously used syncid. Therefore, instead of reexecuting the write command, the disk process will return the same reply to the duplicate request that it did the first time it executed the write operation.

"Syncdepth" refers to the number of requests that a process will recognize as a duplicate. If a process supports a syncdepth of one, that means it will recognize a duplicate of the most recent request; syncdepth 2 means that the process will recognize duplicates of the two most recent requests. The syncid is said to "roll over" when a requestor exceeds the syncdepth between checkpoints. Therefore, to maintain fault tolerance, programers must write programs that track the number of calls to every process and then checkpoint the backup process immediately before roll over.

As will be apparent from the above discussion, in any software program, particularly the more complicated programs, there may be many different failure modes. Thus, testing fault tolerant programs can be extremely difficult, complicated and time consuming. As a result, many fault tolerant programs are insufficiently tested. A number of schemes have been suggested to simplify the creation and testing of fault tolerant programs, however, these generally do not solve the fundamental problem: software programmers seeking to create fault tolerant programs must obtain knowledge sufficient to decide what and when to checkpoint, and design tests that thoroughly explore all of the various failure modes that the program may encounter. As this is difficult, costly and time consuming, there is a great need for a system and process that not only addresses the checkpointing problem, but also makes it unnecessary to test application program code for fault tolerance.

SUMMARY OF THE INVENTION

The present invention automatically converts a non-fault tolerant software program into a fault-tolerant software program. To achieve this goal, the invention includes two separate CPUs, each having a copy of certain software programming code which for convenience will be referred to herein as a "fault tolerant runtime support layer". A communications link, such as an interprocessor bus, allows signals to pass between the two CPUs so that processes running on the two CPUs can communicate with each other. The runtime support layer for each CPU may be implemented as an interface between the application program, which the present invention renders fault tolerant, and the operating system.

One function of the runtime support layer is the creation of a backup process from a non-fault tolerant primary process which will run on the first CPU. Preferably, the application code for the backup process is simply a copy of the code for the primary process. This backup process, however, runs on the separate copy of the runtime support layer on the second CPU.

The runtime support layer also ensures that both the primary and backup processes receive the same inputs. The primary process requests and receives original inputs. The runtime support layer automatically provides these inputs to the backup process. The primary and backup processes therefore perform the same calculations because they include the same code. Thus software programs running on the runtime support layer of the present invention do not require checkpointing in the usual sense as described in the prior section. Moreover, the primary process actually performs the required output operations. Until the primary process fails, the backup process simply discards any output that it generates.

As previously mentioned, the fault tolerant functionality of the present invention may be implemented in an extra layer of code forming an interface between the user application program and any callable procedures of the operating system that perform input or output. This extra layer of code, the fault tolerant runtime support layer, includes a set of procedures that are proxies for corresponding operating system Input/Output ("I/O") procedures. These proxy procedures have interfaces identical to (but may have names different than) the associated operating system procedures. For the primary process, these proxy procedures intercept or replace the actual application program I/O system calls and then make the corresponding I/O call to the operating system. These proxy procedures then return the results of the calls to the primary process. The proxy procedures for the primary process also copy the information returned by the operating system to an input queue for the backup process. In contrast to the situation with the primary process, when the backup process makes an I/O call to the operating system, the proxy procedures do not simply pass on the call to the operating system. Instead, the proxy procedures intercept or replace the actual application program I/O systems calls and then read the information in the backup queue that was previously written there as a result of execution of the corresponding call by the primary process. The proxy procedure then returns this information to the caller. This strategy guarantees that both the primary and backup processes see identical results when executing corresponding calls to the operating system. In addition, in the case of the backup process, the proxy procedures do not produce any output when the application program executes an output instruction. The proxy procedures for the backup process either ignore or suppress output attempts by the backup program to avoid duplicating the output of the primary process; only the primary process is allowed to produce output.

As can be seen from the foregoing discussion, all operations may have the same semantics in the primary and the backup, and all the operations are deterministic. If the operations are provided with the same operands, they will have the same effect on the private states of the primary and the backup processes. Any operands from the private state will be the same in the primary and the backup because the private states are kept synchronized. The runtime layer thus ensures that operands in the form of inputs from the shared state are the same and that outputs from the backup are disregarded rather than repeated.

Sending messages between the primary and backup processes is an expensive operation in terms of processor or CPU time and other computer resources. Therefore, the number of messages sent between the primary process and the backup process should preferably be kept to the minimum required to maintain synchronization between the processes. It is much cheaper to send one large message than several smaller messages. Thus, the primary process should preferably buffer results of system calls as long as possible. To maintain fault tolerance, the primary process must, however, send the buffered results to the backup before a syncid rolls over, or otherwise ensure that all operations which are repeated by the backup process will not adversely affect the proper functioning of the application program.

In addition to performing all communications between the primary and backup processes necessary to maintain synchronization, the runtime layer also preferably performs various supervisory tasks, including starting, monitoring and restarting backup processes, detecting a failed primary or backup process, detecting failed processors, detecting duplicate requests and avoiding the issuance of duplicate requests that cannot be detected. Except as described herein and in the following section, the implementation of each of these supervisory tasks is well known to those working in the field and, therefore, will not be described in detail herein.

The present invention provides numerous advantages over the prior art. A particularly advantageous feature of the present invention is that the runtime support layer automatically converts non-fault tolerant programs to fault tolerant programs by redirecting all system calls that do I/O, as described above. The present invention does not require that the program being made fault tolerant be specially written so that all I/O is accomplished with interprocess messages. Moreover, this conversion may be accomplished without the programer having any special knowledge regarding fault tolerant programming techniques or intervention by the program user, other than simply requesting access to the fault tolerant runtime support layer. The details of making such a request may be automated, if desired. Another important advantage of the present invention is that, once the code embodying the runtime support layer is thoroughly tested for fault tolerance, all processes running thereon need be subjected only to the usual quality assurance testing and debugging associated with typical non-fault tolerant programs. The difficult, time consuming and expensive testing for fault tolerance need not be done since fault tolerance is provided by the runtime support layer.

BRIEF DESCRIPTION OF THE DRAWINGS

The invention will now be described with reference to the accompanying drawings, wherein.

DETAILED DESCRIPTION OF THE PREFERRED EMBODIMENTS

The following description is of the best presently contemplated modes of carrying out the invention. The following description is made for the purpose of further illustrating the general principles of the invention and is not to be taken in a limiting sense.

Figure 1:
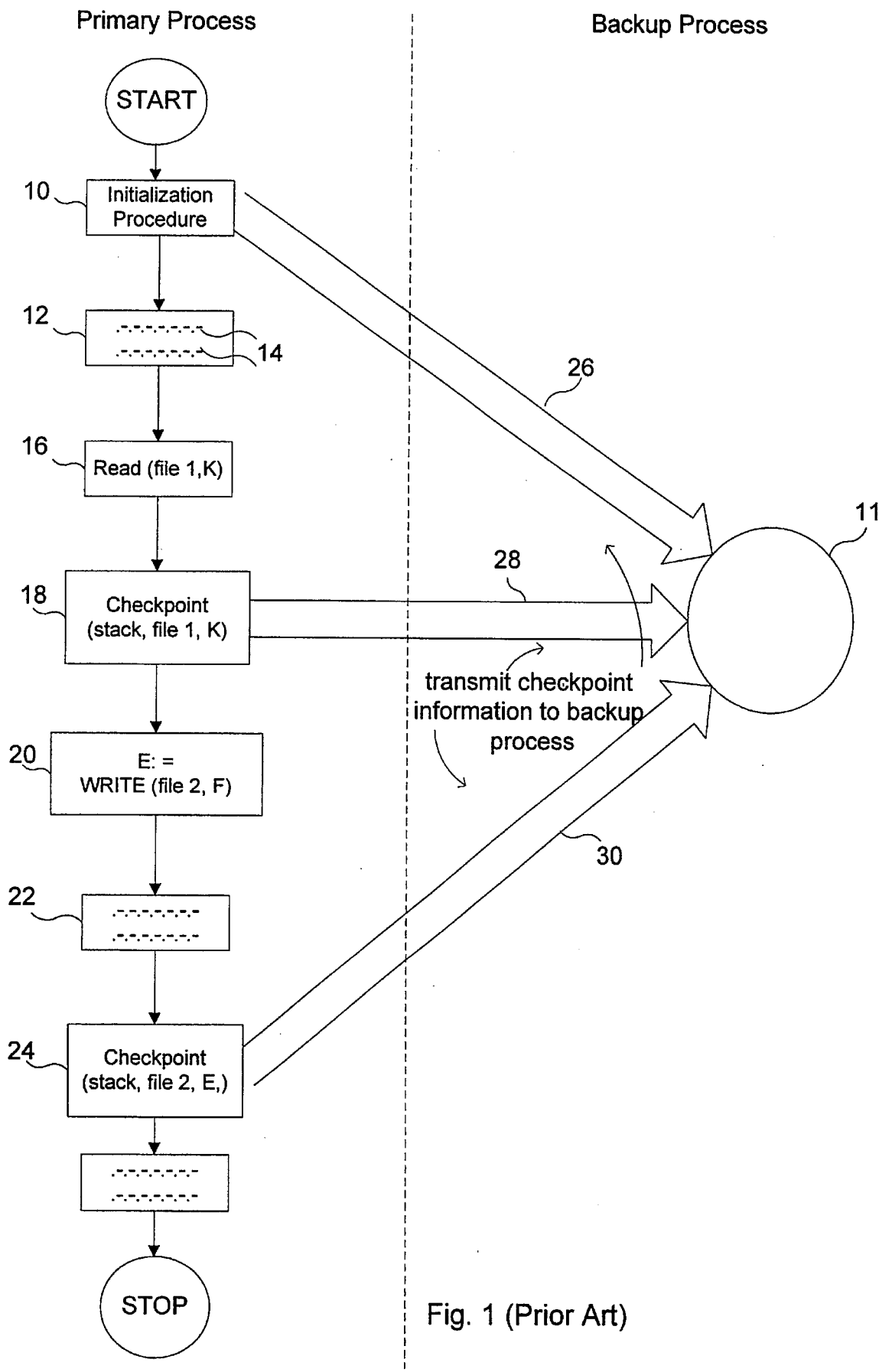
FIG. 1 is a flow chart diagram that conceptually illustrates a prior art fault tolerant application program having a primary process and a corresponding dormant backup process.
Figure 2:
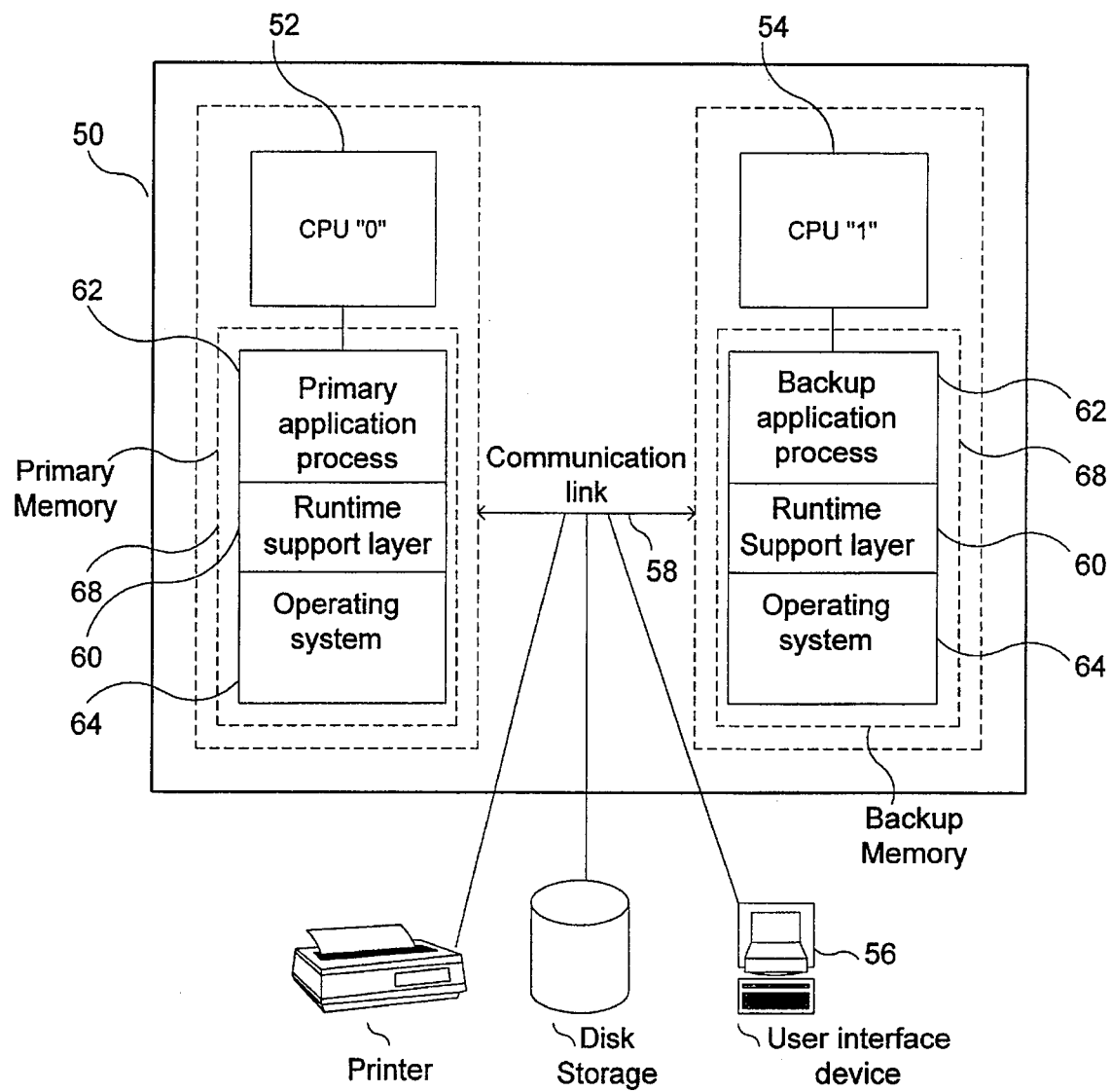
FIG. 2 illustrates a fault tolerant computer system having plural processors separately running a primary process and a redundant backup process. Each process runs on top of a fault tolerant runtime support layer.

FIG. 2 illustrates, from a system or device perspective, a preferred embodiment of the invention of the subject application. The computer system 50 comprises a primary CPU 0, 52, a backup CPU 1, 54, and a user interface device 56, such as a terminal, PC, or workstation. A communication link 58, such as an interprocessor bus, carries information between the primary and backup processes running on the two CPUs 52, 54. As illustrated in this figure, the fault tolerant runtime support layer 60 is configured as an interface between the application program 62 and the operating system 64 for each CPU 52, 54. The fault tolerant runtime support layer 60 contains code that is responsible for the communications between the primary and backup processes. The application code 62 for the primary and backup processes, the runtime support layer 60 and the operating system 64 are resident in memory 68 accessible by CPU0 and CPU1, as illustrated in FIG. 2.

Figure 3:
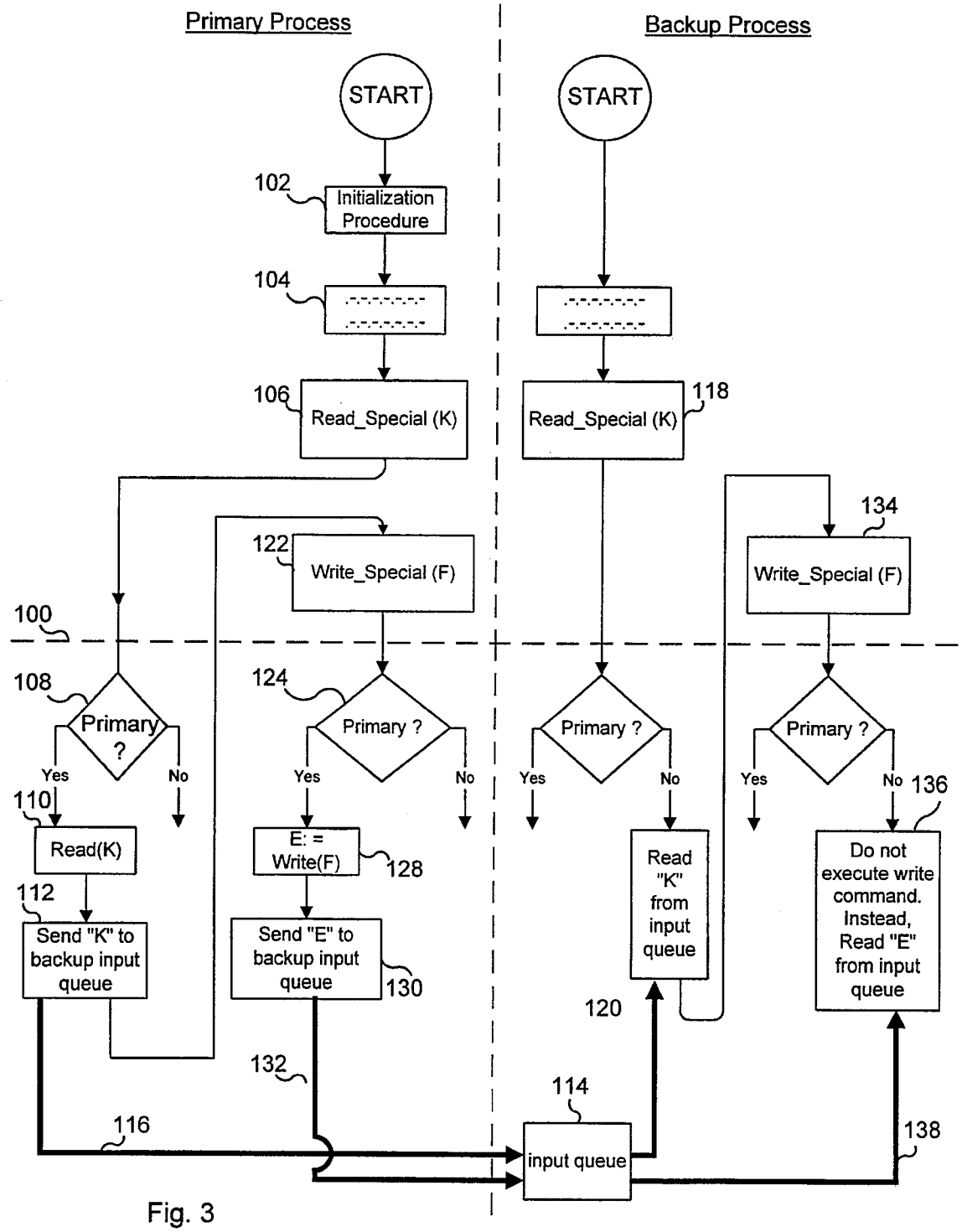
FIG. 3 is a flow chart diagram illustrating the operation of primary and backup processes running on top of fault tolerant runtime support layers, such as illustrated in FIG. 2.

FIG. 3 illustrates the process steps of an exemplary program. The left hand side of FIG. 3 shows the flow of process steps for the primary process 62 running on CPU 0. The right hand side of FIG. 3 shows the analogous process flow for the corresponding backup process 62 running on CPU 1. The steps shown above the horizontal dashed phantom line 100 occur in the user program. The steps shown below the horizontal dashed phantom line 100 occur in the runtime support layer 60. Calls for system I/O illustrated at steps 110 and 128 are directed to the operating system. The bold lines illustrate the flow of data.

As illustrated in FIG. 3, from a method or process standpoint, the initialization procedure 102 is the first step in making a fault tolerant program according to the presently preferred embodiment of the invention. This procedure uses a linker or binder, which operates on the object file for the application program, to redirect external references to system calls to their proxies in the runtime layer 60. To accomplish this, the linker substitutes a proxy call to the runtime layer 60 for each original call in the application program to the operating system. For example, the linker substitutes "write" commands in the original application code that invoke operating system output processes with "write_special" commands. Similarly, the linker substitutes "read" commands in the original application program code with "read_special" commands. The runtime support layer understands the write_special and read_special commands. The runtime layer then begins program execution.

Operations During Input:

Processes steps 102–112 show a presently preferred procedure for handling input. If the primary process executes a call to an input function (e.g., Read_Special, 106), the runtime support layer performs the corresponding read operation 110 in the same way that the application program normally would have performed the read before the read command was replaced with the read_special command 106, i.e., a read call is made, at step 110, to the operating system 64. The runtime layer 60 returns the result of the read operation to the primary process. The runtime layer also transmits the results of the read operation to the backup process input queue 114, as illustrated at reference number 116.

The runtime support layer handles input operations for the backup process differently than input operations for the primary process. If the backup process executes an input command, such as read_special, 118, the fault tolerant runtime layer does not simply pass on the call to the operating system as it did for the primary process. Instead, the runtime layer reads from the input queue 114 for the backup process, as illustrated at reference number 120. Provided that the primary process previously executed the corresponding read and copied the result to the input queue 114, then the backup process simply reads the information that the primary process previously transmitted to its input queue 114. Alternatively, however, if the backup process performs the read, in real time, prior to the primary process, then the backup process simply waits until the primary process transmits the information to its input queue 114 and then reads the information from the queue 114.

Operations During Output:

Process steps 122–130 show the presently preferred procedure for handling output in the primary process. If the primary process executes a call to an output function (e.g., Write_Special, 122), the runtime support layer 68 performs the write operation in the same way that the application program normally would have performed the write before the write command was replaced with the write_special command, 122, i.e., an write call 128 is made to the operating system. The runtime layer 68 then returns the results of the write operation, for example an error message, E, to the primary process. The runtime layer 68 also transmits the results of the write operation to the input queue 114 for the backup process, as illustrated at reference number 132.

The runtime support layer handles output operations for the backup process differently than output operations for the primary process. If the backup process executes an output command, such as write_special, 134, the fault tolerant runtime layer 68 does not simply pass on the output call to the operating system 64 as it did for the primary process. Instead, the runtime layer reads from the input queue 114 for the backup process, as illustrated at reference numbers 136, 138. Provided that the primary process previously executed the corresponding write 128 and copied the results to the backup process input queue 114, then the backup process simply reads the information which the primary process previously transmitted to the input queue, 114. Alternatively, however, if the primary process is running, in real time, behind the backup process, then the backup process waits until the primary process transmits the information to its input queue, 114 and then reads the information from the queue 114.

Supervisory Functions of the Runtime Layer:

In addition to performing all communications between the primary and backup processes necessary to keep them synchronized, as described above, the runtime layer also handles various ancillary supervisory functions. The ancillary supervisory functions may differ somewhat depending upon the particular operating environment and computer hardware used. In general, supervisory ancillary functions will include such things as starting a backup process, monitoring the primary and backup processes for failures, monitoring the processors for failures, restarting the backup process upon failure, detecting duplicate requests and avoiding the issuance of duplicate requests that cannot be detected. All of these functions are preferably performed transparently to the user.

The runtime layer must also deal with synchronous and asynchronous traps. Synchronous traps (such as dividing by zero) will occur in the same way in both the primary and backup processes. These traps can be handled as a failure of the primary process. Asynchronous traps must be handled differently. One type of asynchronous trap of particular interest is a software driven interrupt which interrupts a process after a certain elapsed time. One way to handle such an asynchronous interrupt is to capture it in the runtime layer and only report the interrupt to the primary process when the primary process next calls the runtime layer. This procedure will place the trap in the same place in both the primary and backup processes. However, this procedure will not work if the program is stuck in an infinite loop which does not call the runtime layer. In this case, the runtime layer may be programmed to initiate a complete checkpoint of the entire program state if the application program does not make a system call within an arbitrarily predetermined amount of time. In any event, the above supervisory functions are otherwise known in the art and may be implemented in conjunction with the present invention based upon this disclosure.

A Low Level Implementation of the Present Invention

A particularly preferred implementation of the present invention involves the forwarding of synchronizing information from the primary process to the backup process automatically over the computer system's message system. According to this embodiment, the message system in the primary process preferably buffers the inputs and periodically flushes the buffered messages (generally when a syncid is about to roll over) to the backup process. The message system for the backup process receives all of its inputs in this way from the primary process. Capturing and transmitting inputs at the message system level is usually easier than in user code (as in the previously described embodiment) because all message system messages are in a single format (message format) and enter the processes through a relatively smaller number of message system calls. In contrast, at the user level, a large number of different system calls perform I/O and that I/O takes more forms, e.g., actual data that is read, condition codes, file synchronization information, file positioning information, etc. In addition to generally being easier to implement, the low level implementation has certain performance advantages. For example, it requires less bookkeeping and it uses the message system rather than the file system to move checkpoint data from the primary process to the backup process.

Appendix A contains Pascal and Tandem Transaction Application Language programming language source code simulating such a low level implementation of the present invention as described immediately above. In this limited prototype, extra functionality is added at the message system interface. As in the user-level prototype of the fault tolerant runtime support environment contained in Appendix B, the extra functionality captures and forwards all inputs from the primary process to the backup process, but it does so at the message system level. The inputs are buffered in the primary process until a checkpoint is necessary. It is assumed that a reserved extended segment can be used for this buffering. In the prototype of Appendix A, application level code tells the message system when to flush the buffered input; in a more complete prototype, the file system would preferably have this responsibility. Moreover, in the limited prototype of Appendix A, the backup process does not act on the information received from the primary process. The backup process of this prototype simply acts as a message sink, so the model is primarily useful for predicting the performance of the primary process.

The Working Prototype

Appendix B contains Pascal and Tandem Transaction, Application Language programming language source code for a working prototype of the fault tolerant runtime support layer of the present invention for standard, large model, C00 C programs. As described earlier, this runtime support layer is code which, conceptually, resides between the user program and the operating system. The working prototype contained in Appendix B is designed for use on the NON-STOP® operating system available from Tandem Computers Incorporated of Cupertino Calif. Since the runtime support layer has interfaces identical to the NONSTOP® operating system interfaces, no special coding is necessary for user programs designed to run on a NONSTOP® operating system and no changes are required for the C Compiler or runtime environment. The fault tolerant runtime layer of the present working prototype of Appendix B is responsible for starting and monitoring the backup process, for deciding what and when to checkpoint, for recovering from processor or process failures, and for using heuristic methods to detect duplicate requests that are not tracked by syncids. Such heuristic methods are known to those skilled in the art and, therefore, are not described in detail here. A simple example will suffice:

Suppose a file is purged by a primary process shortly before the primary process fails. The backup process then becomes a primary process and is about to repeat the same purge operation. The runtime support layer notices that the current primary process has recently taken over from the previously failed primary process, and knows that the primary process may have already purged the file. If the file does not exist, but did exist before the original primary process died, the runtime support layer assumes that the original primary process successfully purged the file and returns a normal completion to the application program rather than a message indicating that the file was not found. If the file is found to exist, then the file is purged.

The fault-tolerant runtime support layer of Appendix B will run any standard, large model C00 C program, with the following conditions:

The top 1K words of the user stack are reserved.

About 1K of primary memory below the user stack is used by the runtime layer.

The prototype runtime layer does not handle all cases where two identical systems calls happening dose together (but not at the same instant) could produce different results because a change in device or network configuration has occurred between them. One of ordinary skill in the art can easily devise code to handle this contingency based upon the present disclosure.

If a program uses more than standard C it will not be detected and the results will be unpredictable.

The runtime layer insists on having a backup. It will not run on a one processor system.

The data block names IPC_Rcv_Fnum, IPC_Backup_Fnum, IPC_My_Name, and PS_Data are reserved.

It should be emphasized that these conditions are not in any way limitations of the invention itself, but are merely requirements unique to the particular exemplary prototype program contained in Appendix B.

Multiple preferred embodiments of the present invention have been described. Nevertheless, it will be understood that various modifications will be apparent to those skilled in the art based upon the foregoing disclosure. Such modifications may be made without departing from the spirit and scope of the present invention.

What is claimed is:

1. A method for automatically converting a non-fault tolerant primary program running on a computer system having an operating system into a fault tolerant program, the method comprising the steps of:

a. creating a duplicate backup program;

b. determining whether the non-fault tolerant primary program or the backup program issued operating system I/O calls;

c. for I/O calls issued by the non-fault tolerant primary program, causing the operating system to execute the calls and transmitting the results of the calls to the backup program; and d. for I/O calls issued by the backup program, Preventing the operating system from executing the I/O calls issued by the backup program and reading the results transmitted as a result of the execution of the corresponding calls in the non-fault tolerant primary program;

whereby the non-fault tolerant primary program is converted into a fault tolerant program.

2. The method as in claim 1, further including the step of intercepting operating system I/O calls from the non-fault tolerant primary program and the backup program before the I/O calls reach the operating system, wherein the operating system I/O calls are intercepted by a layer of code which forms an interface between the operating system and each of the non-fault tolerant primary program and the backup program.

3. A method as in claim 1, wherein the non-fault tolerant primary and backup programs run on difference CPUs.

4. A method as in claim 3, wherein the transmission of the results occurs across an interprocessor bus.

5. A method for automatically converting a non-fault tolerant primary process running on a computer system having an operating system into a fault tolerant process, the method comprising the steps of:

a. executing a non-fault tolerant primary process, including a first set of computer instructions;

b. creating a backup process, including a second set of computer instructions, wherein the second set of instructions includes a copy of at least a portion of the first set of instructions;

c. upon issuing an input call by the non-fault tolerant primary process, causing the operating system to perform a corresponding input operation, and transmitting the input results of the input operation from the non-fault tolerant primary process to the backup process, a first layer of code interfacing between the non-fault tolerant primary process and the operating system; and d. upon issuing an input call by the backup process, reading the input results transmitted from the non-fault tolerant primary process, a second layer interfacing between the backup process and the operating system.

6. The method of claim 5, further comprising the step of storing the input results in a backup process input queue prior to the reading of the input results.

7. The method of claim 5, further comprising the steps of:

a. upon issuing an output call by the non-fault tolerant primary process, causing the operating system to perform a corresponding output operation and transmitting the output results of the output operation from the non-fault tolerant primary process to the backup process; and b. upon issuing an output call by the backup process, reading the output results transmitted from the non-fault tolerant primary process.

8. The method of claim 5, wherein the non-fault tolerant primary process and backup process execute on different processors.

9. The method of claim 7, wherein the non-fault tolerant primary process and backup process execute on different processors.

10. A system for automatically converting a non-fault tolerant primary software process into a fault tolerant software process on a multiprocessor computer system, comprising:

a. means for executing the non-fault tolerant primary software process on a first processor of the computer system;

b. means for creating a backup software process to run on a second processor of the computer system;

c. a communications link coupled between the first and second processors;

d. means, associated with the first processor, for causing the operating system to perform I/O functions in response thereto and transmitting the results of the I/O functions to the second processor over the communications link; and e. means, associated with the second processor and operable upon the issuance of an I/O call by the backup software process, for inhibiting an output operation by the operating system and reading the results transmitted from the first processor upon the issuance of an output call by the backup software process, and for reading the results transmitted from the first processor upon the issuance of an input call by the backup software process.

11. The system of claim 10, further comprising an input queue operatively coupled to the first and second processors to receive the results transmitted from the first processor, the queue being readable by a software running on the second processor.

12. The method of claim 5, further comprising the steps of:

upon issuing the input call by the non-fault tolerant primary process, intercepting, by a first layer of code, the input call from the non-fault tolerant primary process before the input call reaches the operating system, the first layer of code interfacing between the non-fault tolerant primary process and the operating system; and upon issuing the input call by the backup process, intercepting, by a second layer of code, the input call from the backup process before it reaches the operating system, the second layer interfacing between the backup process and the operating system.

13. The method of claim 12, further comprising the steps of:

upon issuing an output call by the non-fault tolerant primary process, intercepting, by the first layer of code, the output call from the non-fault tolerant primary process before the output call reaches the operating system; and upon issuing an output call by the backup process, intercepting, by the second layer of code, the output call from the backup process before it reaches the operating system.

14. The system of claim 10, wherein said means for causing includes means for intercepting I/O calls issued by the non-fault tolerant primary software process before the I/O calls reach the operating system.

* * * * *